US011186511B2

(12) United States Patent
Demott et al.

(10) Patent No.: US 11,186,511 B2
(45) Date of Patent: Nov. 30, 2021

(54) SUBMERGED COMBUSTION MELTER

(71) Applicant: KNAUF INSULATION, Vise (BE)

(72) Inventors: Gerard Demott, Majcichov (SK);
Bostjan Marolt, Poljane (SI); David Ducarme, Wavre (BE)

( * ) Notice: Subject to any disclaimer, the term of this patent is extended or adjusted under 35 U.S.C. 154(b) by 64 days.

(21) Appl. No.: 16/733,196

(22) Filed: Jan. 2, 2020

(65) Prior Publication Data
US 2020/0148573 A1    May 14, 2020

Related U.S. Application Data

(63) Continuation of application No. 15/545,987, filed as application No. PCT/EP2016/051730 on Jan. 27, 2016, now Pat. No. 10,526,230.

(30) Foreign Application Priority Data

Jan. 27, 2015 (GB) ..................................... 1501305

(51) Int. Cl.
| C03B 5/235 | (2006.01) |
| F23D 14/78 | (2006.01) |
| F23D 14/58 | (2006.01) |
| F23D 14/22 | (2006.01) |
| F23C 3/00  | (2006.01) |

(52) U.S. Cl.
CPC .......... *C03B 5/2356* (2013.01); *C03B 5/2353* (2013.01); *F23C 3/004* (2013.01); *F23D 14/22* (2013.01); *F23D 14/58* (2013.01); *F23D 14/78* (2013.01); *Y02P 40/50* (2015.11)

(58) Field of Classification Search
None
See application file for complete search history.

(56) References Cited

U.S. PATENT DOCUMENTS

| 9,032,760 B2 | 5/2015 | Charbonneau |
| 9,643,871 B2 | 5/2017 | Cowles |
| 2010/0089383 A1 | 4/2010 | Cowles |
| 2011/0236846 A1 | 9/2011 | Rue et al. |
| 2016/0060154 A1 | 3/2016 | Cowles |
| 2016/0130168 A1* | 5/2016 | Cowles ................. C03B 5/2356 65/346 |

FOREIGN PATENT DOCUMENTS

DE          10029983        1/2002

* cited by examiner

*Primary Examiner* — Queenie S Dehghan
(74) *Attorney, Agent, or Firm* — Knauf Insulation, Inc.; James K. Blodgett; Brandon N. Hudder

(57) ABSTRACT

The invention relates to a submerged combustion burner (1) and to a melter comprising submerged combustion burners (1). The burner comprises at least one oxidant feeding tube, at least one fuel feeding tube, a burner head having a peripheral envelope, the fuel and oxidant feeding tubes abutting against the burner head, at least two, preferably at least three, peripheral outward directed nozzles, each of the nozzles having a nozzle outlet, the nozzle outlets being arranged on a peripheral line on the peripheral envelope of the burner head, the nozzle outlet axis being inclined by an angle of 5 to 30° to the horizontal, and the nozzles practiced in the burner head being connected to the oxidant feeding tube and to the fuel feeding tube.

11 Claims, 3 Drawing Sheets

SUBMERGED COMBUSTION MELTER

CROSS-REFERENCE TO RELATED APPLICATIONS

Figure 1:
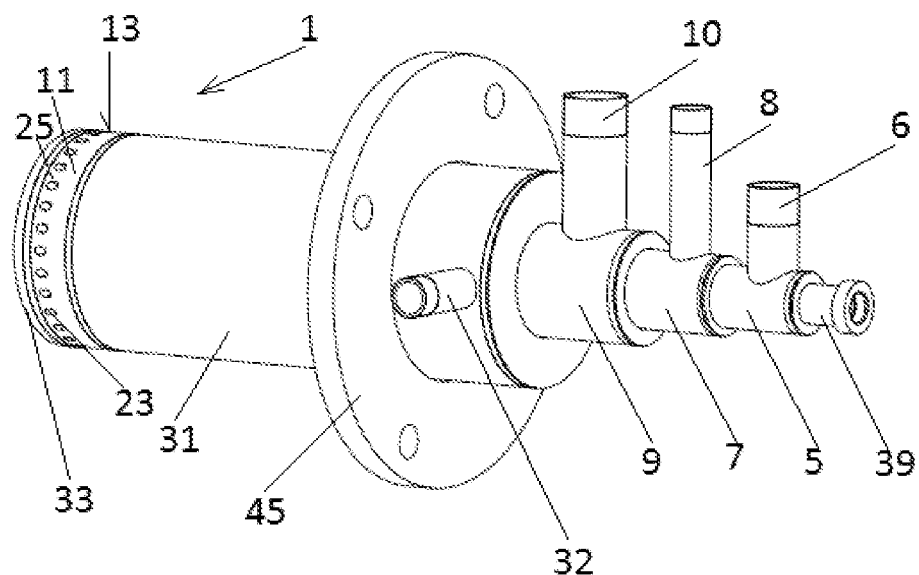

This application is a continuation application of U.S. application Ser. No. 15/545,987, filed Jul. 24, 2017, which is a U.S. national counterpart application of International Application Serial No. PCT/EP2016/051730, filed Jan. 27, 2016, under 35 U.S.C. § 371, which claims priority to GB Application Serial No. 1501305.5, filed Jan. 27, 2015, the disclosures of which are hereby incorporated herein by reference.

The present invention relates to a burner for use in submerged combustion melters, and to submerged combustion melters, notably for melting vitreous or vitrifiable material.

Vitreous materials are generally manufactured from a mixture of raw materials, for example silicates, basalt, limestone, soda ash and other minor constituents which are introduced into a melter and melted into a viscous liquid state at temperatures in the order of 1250 to 1500° C.; the melt is then supplied to a forming process. Depending on the intended use of the melt, for example for manufacture of flat glass, hollow glass, continuous fibers for reinforcement purposes or fibers for insulation purposes, an appropriate further melt refining step may be required upstream of the forming process. The chemical composition of the melt and its physical properties are selected as a function of the intended use and the forming process.

Conventional glass melters comprise an energy supply from above a glass melt surface, for instance from burners generating a flame in a space between the glass melt surface and a crown of the melter, whereby heat is transferred to the glass melt by the flame itself and by radiation from the crown material. Raw batch material to be melted is loaded at the top of the glass melt in the melter and heat is transferred from the melt to the batch material which is incorporated into the melt.

In some glass melters, energy is supplied by electrically heated electrodes arranged below the surface of the melt; such electrodes may provide the only heat source or be used in combination with burners.

Glass melters used to manufacture stone wool insulation have traditionally been cupola furnaces.

In submerged combustion melting raw materials are generally melted by introducing fuel gas and oxygen containing gas through the mass of molten material, causing said fuel gas and oxygen to mix and burn within said mass, melting additional raw material by the heat generated by the burning gas mixture. In an alternative, fuel gas and air and/or oxygen are burned outside the said mass and the hot combustion gases are blown into the glass melt.

Conventional burners used for submerged combustion generally produce a flame that shows a tendency to become unstable, particularly under extreme conditions of agitation in a glass melt. Conventional burners either burn the fuel gas and the oxidant in a combustion chamber and blow the combustion gases into the glass melt, or blow the fuel gas and the oxidant through concentric tubes into the glass melt for combustion therein.

Conventional burners for submerged combustion melting of vitrifiable material generally comprise concentric pipe burners, also called tube-in-tube burners. The inner tube generally is designed for blowing the fuel gas and the outer tube is designed for blowing the oxidant.

Known submerged combustion burners generate high agitation and elevated material velocities in the melt bath of the submerged combustion melter.

The present invention seeks to provide an improved submerged combustion burner capable of generating burner flames that show improved flame stability and/or reduced agitation in a melt bath. The invention further seeks to provide an improved submerged combustion melter that shows reduced agitation of the melt bath.

The submerged combustion burner of the invention comprises at least one oxidant feeding tube, at least one fuel feeding tube, a burner head having a peripheral envelope, the fuel and oxidant feeding tubes abutting against the burner head, at least two, preferably at least three, peripheral outward directed nozzles, each of the nozzles having a nozzle outlet, the nozzle outlets being arranged on a peripheral line on the peripheral envelope of the burner head, the nozzle outlet axis being inclined by an angle of 5 to 30° to the horizontal, and the nozzles practiced in the burner head being connected to the oxidant feeding tube and to the fuel feeding tube.

The submerged combustion melter of the invention comprises at least one submerged combustion burner as per the invention. Preferably, at least two or more preferably at least three of such submerged burners are provided in the melter, preferably at the bottom of the submerged combustion melter.

Melting may be carried out using a method and/or melter disclosed in any of WO 2015/014917, WO 2015/014918, WO 2015/014919, WO 2015/014920 or WO 2015/014921, each of which is hereby incorporated by reference.

It has been found that the invention burner design allows for a reduced gas speed at which the combustion gases escape out of the burner head, with concomitant reduction of material velocities in the melt bath and hence reduced agitation in the melt bath. Furthermore, the arrangement of the burner nozzles laterally, on a peripheral envelope of the burner head reduces the risk of the burner being plugged with hardening or hardened melt in exceptional or extreme or transitional situations.

The burners advantageously comprise a circular burner head. According to a preferred embodiment, the feeding tubes are concentric. In one embodiment, the burner comprises two concentric feeding tubes. In another embodiment, three concentric feeding tubes are provided. In a preferred such burner design, the internal feeding tube is an oxidant feeding tube, the middle feeding tube is a fuel feeding tube and the external tube is an oxidant feeding tube.

The burner and/or the melter may be adapted and/or configured to sinter and/or melt raw materials. It may be a "glass melter", that is to say a melter adapted and configured to melt glass-like materials including materials selected from glass, vitreous materials, stone and rock. A glass melter may be used to manufacture flat glass, hollow glass, glass fibers, continuous fibers for reinforcement purposes, mineral fibers for insulation purposes, mineral wool, stone wool or glass wool. The melter may be used to transform raw materials to manufacture frits, cement clinker, notably alumina cement clinker, or abrasives, notably abrasives produced by melting. The melter may be used to transform raw materials, notably by vitrification, for example: vitrification of medical wastes; vitrification of ash, notably from incinerators; vitrification of powders, for example dusts from cast iron or other metal foundries; vitrification of galvanic sludge, tannery sludge or mining industry waste; disposal of waste, notably by vitrification, for example, of polluted soil, soil polluted by heavy metals or tar, clay filters, sludge, activated carbon, radioactive waste, slags containing lead or zinc, refractories, notably refractories containing chromium. Particularly in the case of a glass melter, the raw materials may comprise: silicates, basalt, limestone, soda ash, zeolite catalyst, spent catalyst, spent pot liner, refractory materials, aluminum dross, aluminum melting scum, sand based fire extinguisher waste, sludge, galvanic sludge, clinker, waste materials, ash and combinations thereof.

The melt within the melter during operation may reach a temperature, notably a temperature at which it is removed from the melter, which is at least 1100° C., at least 1200° C. or at least 1250° C. and which may be no more than 1650° C., no more than 1600° C., no more than 1500° C. or no more than 1450° C.

The fuel gas may comprise natural gas; it may comprise propane and/or butane.

The burner may further comprise a connection to an inert gas source, notably a nitrogen source. If burning is interrupted, it may be desired to blow high pressure nitrogen through the burner assembly instead of oxidant and/or fuel gas in order to prevent material, for example melt, notably liquid glass from entering the burner and solidifying within it.

According to another preferred embodiment, part at least of the burner length may be enveloped by a cooling jacket, closed at both ends and comprising an inlet connected to a source of cooling fluid, preferably water, and an outlet connected to a cooling fluid circuit. This arrangement facilitates cooling of the burner when in use.

According to a preferred embodiment, the cooling jacket extends over part of the length of the feeding tubes up to the burner head, the cooling jacket having a first connecting tube, the burner head comprises a burner cap defining a burner head space between burner cap and burner head, the burner head further comprises through holes connecting the jacket with the burner head space, and a cooling fluid feeding tube extending essentially concentrically in the internal gas feeding tube and connecting the burner head space with a second connecting tube. This arrangement allows for cooling of the burner head by passing cooling fluid over, and axially through the burner head.

Preferably, the burner head comprises at least two, preferably at least three nozzle bores extending essentially radially through the burner head starting from the nozzle outlet; each nozzle bore being connected by feeding bores to the relevant feeding tubes extending up to and abutting against the burner head.

There is thus also provided a method of introducing a flame and/or combustion products from a submerged combustion burner into a melt through a multitude of nozzles essentially radially arranged in a burner head, the nozzle outlets of said nozzles being inclined by 5 to 30° to the horizontal. Such burners are particularly suitable for use in submerged combustion melters, for example for the manufacture of glass fibers, mineral wool fibers, glass wool fibers and stone wool fibers. Particularly in such cases, said burners are generally arranged through the bottom of submerged combustion melters and may slightly extend within the liquid glass bath. Suitable cooling of the end extending through the furnace bottom thus protects the burner from excessive wear.

The operating pressure of such a submerged combustion burner, that is the pressure of the gasses generated inside the burner needs to be sufficient for the gasses to overcome the liquid pressure in the melt and thus bubble up through the melt and generate an agitated melt. Advantageously, the pressures are controlled in such a way that melt particles reach a speed of up to 2 m/s. The melt and/or the raw materials within the melter may reach a speed which is ≥0.1 m/s, ≥0.2 m/s, ≥0.3 m/s or ≥0.5 m/s and/or which is ≤2 m/s, ≤1.8 m/s or ≤1.5 m/s.

The speed of the combustion and/or combustible gases, notably at the exit from the burner nozzle(s), may be ≥60 m/s, ≥100 m/s and/or ≤300 or ≤200 m/s. Preferably the speed of the combustion gases is in the range of about 60 to 200 m/s, preferably 110 to 150 m/s.

The oxygen containing gas may be air but is preferably oxygen, technical grade oxygen for example gas having an oxygen content of at least 95% by weight or oxygen enriched air. According to a preferred embodiment the oxygen containing gas injected in the internal tube is either air or oxygen enriched air or oxygen, while the oxygen containing gas injected into the outer tube preferably is oxygen.

Preferably, the injected gas keeps the molten mass in a state of agitation, that is a bubbly mass. The heat transmission is thus significant and the stirring of the bath is favorable to the homogeneity of the finished product. The fumes escaping from the bath may be kept under high pressure and may travel through fresh raw material in order to promote heat exchange and preheat said raw material.

The height of a melt pool within the melter, especially when the melting chamber is substantially cylindrical, preferably with an internal diameter of the melting chamber of 1.5 m to-3 m, more preferably 1.75 to 2.5 m, may be:
≥ about 0.75 m, ≥ about 0.8 m, ≥ about 0.85 m or ≥ about 0.9 m; and/or
≤ about 2.2 m, ≤ about 2 m, ≤ about 1.8 m, or ≤ about 1.6 m.

The submerged combustion melter may have a number of such submerged combustion burners which is ≥2, ≥3, ≥4 or ≥5 and/or ≤30, ≤25, ≤20, ≤18, ≤15, ≤12 or ≤10.

The composition of the melt produced by the submerged combustion in the case of a glass melter may comprise one or more of:

| | Possible melt composition (% weight) | Preferred melt composition (% weight) |
|---|---|---|
| $SiO_2$ | 35-70 | 40-65 |
| $Al_2O_3$ | 5-30 | 15-25 |
| CaO | 5-20 | 5-12 |
| MgO | 0-10 | 1-7 |
| $Na_2O$ | 0-20 | 5-18 |
| $K_2O$ | 0-15 | 0-10 |
| $Fe_2O_3$ (total iron) | 0-15 | 0.5-10 |
| $B_2O_3$ | 0-10 | 0-5 |
| $TiO_2$ | 0-5 | 0-2 |
| $P_2O_5$ | 0-3 | 0-2 |
| MnO | 0-3 | 0-2 |
| $Na_2O + K_2O$ (alkali metal oxide) | 5-30 | 5-20 |
| CaO + MgO (alkaline earth metal oxide) | 5-30 | 5-20 |
| $SiO2 + Al2O3$ | 50-85 | 60-80 |

Figure 2:
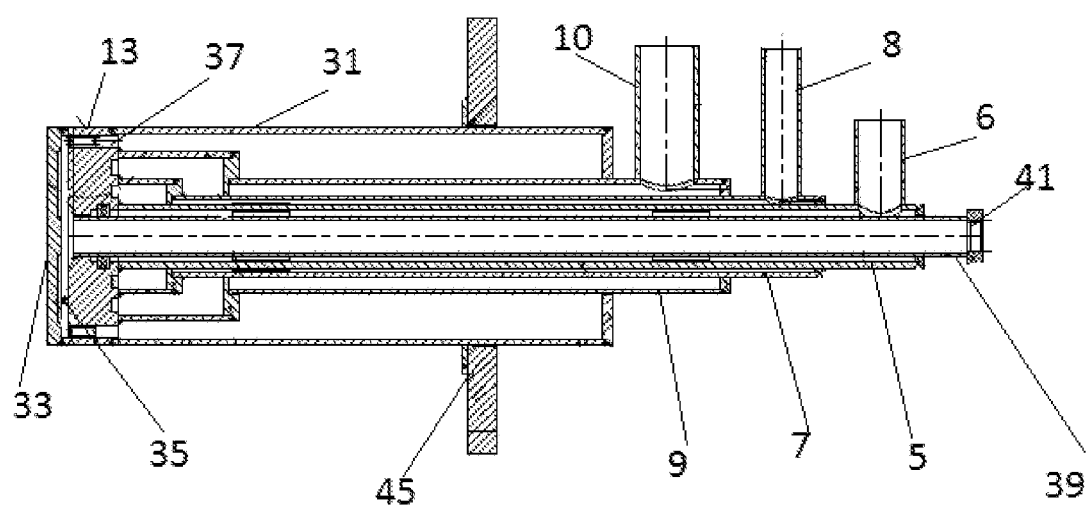
Figure 3:
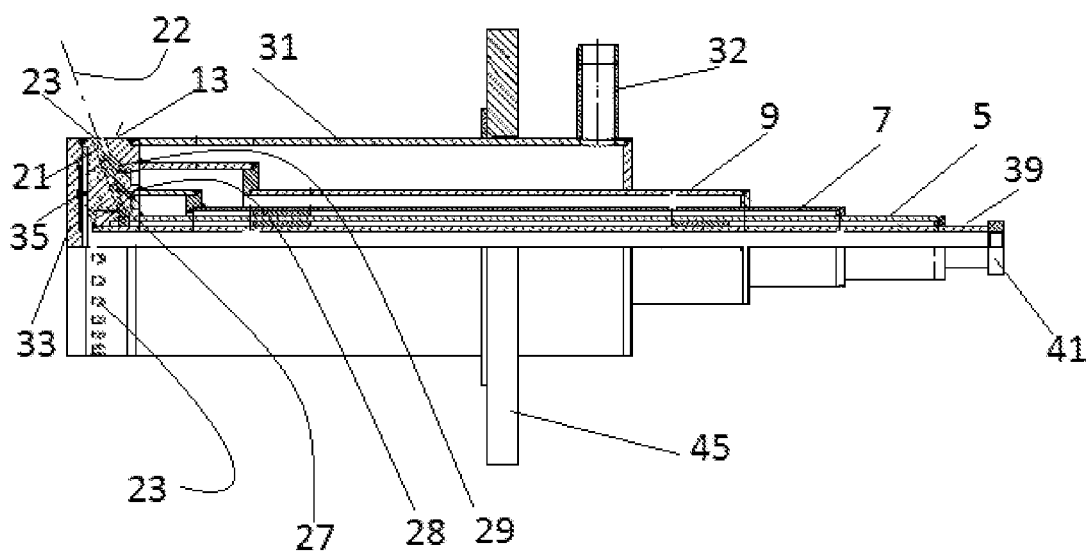
Figure 4:
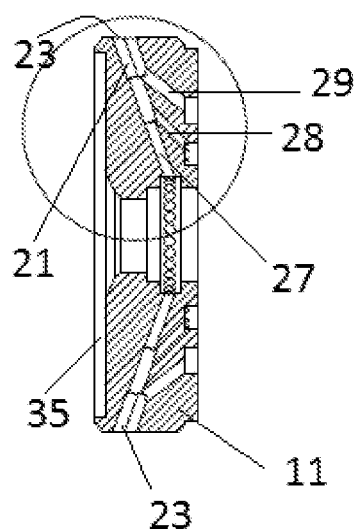

The present invention will be described in more details with reference to the attached drawings of which:

FIG. 1: is a perspective view of a preferred embodiment of a burner of the invention;

FIG. 2: is a longitudinal cross section through a submerged combustion burner of the invention;

FIG. 3: is a partial longitudinal section according to a different plane from the one used in FIG. 2;

FIG. 4: is an enlarged cross-section through the burner head; and

Figure 5:
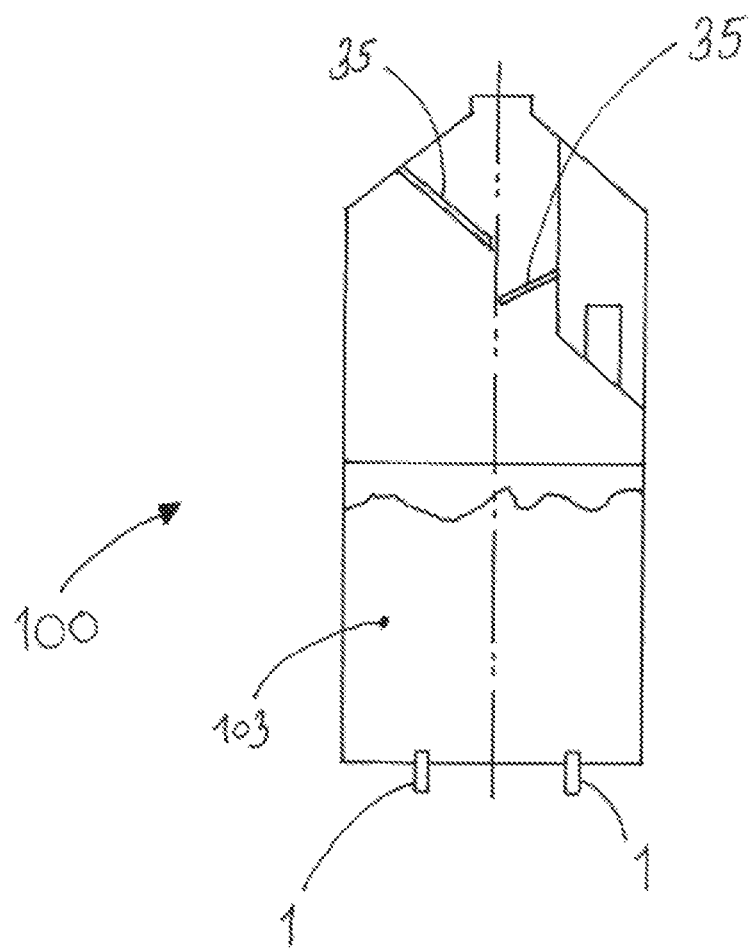

FIG. 5 is a schematic representation of a submerged combustion melter.

The illustrated submerged combustion burner 1 comprises an internal oxidant feeding tube 5, a middle concentric fuel feeding tube 7, an external concentric oxidant feeding tube 9, and a burner head 11 having a peripheral envelope 13. The fuel and oxidant feeding tubes 5, 7, 9 abut against the burner head 11. The burner head 11 is advantageously circular and equipped with a multitude of peripheral outward directed nozzles 21, each of the nozzles 21 having a nozzle outlet 23 arranged on a peripheral line 25 on the peripheral envelope 13 of the burner head 11. The nozzle outlet axis 22 is inclined by an angle of 5 to 30° to the horizontal. Each nozzle 21 practiced in the burner head 11 is connected to the oxidant feeding tubes 5 and 9 and to the fuel feeding tube 7 by respective feeding bores 27, 28 and 29. Oxidant feeding tube 5 shows a connecting pipe 6 for connection to an oxidant gas source, such as a source of technical oxygen or oxygen enriched air or air. Fuel feeding tube 7 shows a connection pipe 8 for connection to a fuel source, such as a source of natural gas, propane or butane gas. Similarly, oxidant feeding tube 9 comprises a connection pipe 10 for connection to an oxidant gas source which may be the same or different from the oxidant gas source connected to feeding tube 5. Part or all of the feeding tubes may intermittently be connected to an inert gas source, notably a nitrogen source, such as to allow blowing of high pressure nitrogen through the burner and particularly through the nozzles to prevent liquid vitrifiable material to enter into the nozzles, solidify in, and hence plug, the burner. According to the exemplified embodiment, part of the burner length is enveloped by a cooling jacket 31, closed at both ends and comprising an inlet 32 connected to a source of cooling fluid, preferably water. The cooling jacket 31 extends over part of the length of the feeding tubes up to the burner head 11. The burner head 11 comprises a burner cap 33 defining a burner head space 35 between burner cap 33 and burner head 11. The burner head 11 further comprises through holes 37 connecting the jacket 31 with the burner head space 35. A cooling fluid feeding tube 39 extending essentially concentrically in the internal gas feeding tube 5 across the burner head 11 connects the burner head space 35 with a cooling fluid outlet connection 41. This arrangement allows for cooling of the gas feeding tubes as well as of the burner head by passing cooling fluid around and through the feeding tubes, and over, and axially through the burner head.

A submerged combustion burner as described here above is particularly suitable for a submerged combustion melter. A submerged combustion melter may comprise at least one submerged combustion burner as described. Preferably, at least two or more preferably at least three, at least four or at least five and/or less than 30, less than 25, less than 20, less than 18, less than 16, less than 14, less than 12 or less than 10 of such submerged burners are provided in the submerged combustion melter, depending on its dimensions, preferably at the bottom of the submerged combustion melter. It has been found that the burners allow for a reduced gas speed at which the combustion gases escape out of the burner head, with concomitant reduction of material velocities in the melt bath and hence reduced agitation in the melt bath. Furthermore, the arrangement of the burner nozzles laterally, on a peripheral envelope of the burner head reduces the risk of the burner being plugged with hardening or hardened melt in exceptional or extreme or transitional situations.

The burners may be arranged through a wall or preferably a bottom of a submerged combustion melter and fastened thereto by a mounting flange 45 adapted for securing it into a furnace bottom, for instance by means of screws or other fasteners guided through an appropriate number of flange fastening holes 47 in order to tightly fasten the burner 1 at a furnace bottom. The distance between the mounting flange 45 and the top of the burner cap is sufficient for the burner to traverse the melter wall or bottom and to protrude into the melter. This arrangement allows to maintain the burner flames at a desired distance from the relevant wall or bottom. Suitable cooling of the burner as described above thus protects the burner from excessive wear.

A submerged combustion melter of the invention comprises a furnace 100 comprising a melting chamber 103 equipped with at least one burner as described, which contains a melt and communicates with an upper chamber 105 and a chimney for evacuation of fumes. The upper chamber 105 is equipped with baffles 107 that block upwards projection of any melt thrown from a surface of the melt by the agitation caused by the burner flames and/or gasses. These hot gases may be used to preheat the raw material and/or the fuel gas and/or oxidant used in the burners. The fumes escaping from the bath may be kept under high pressure and may travel through fresh raw material in order to promote heat exchange and preheat said raw material. The fumes generally are filtered prior to release to the environment, optionally following dilution with fresh air to reduce their temperature. The injected gas keeps the molten mass in a state of agitation, that is a bubbly mass. The heat transmission is thus significant and the stirring of the bath is favorable to the homogeneity of the finished product.

The melt may be withdrawn from the furnace chamber through a controllable outlet opening (not shown) located in the furnace chamber side wall, close to the furnace bottom essentially opposite a raw material feeder device 110.

The furnace wall advantageously comprises a double steel wall cooled by a cooling fluid, preferably water. Cooling water connections are provided at the external furnace wall. The flow of cooling liquid is preferably sufficient to withdraw energy from the inside wall such that melt can solidify on the internal wall and the cooling liquid, here water, does not boil.

If so desired, the furnace may be mounted on dampers which are designed to absorb vibrational movements.

The melter is particularly advantageous for manufacture of glass fibers, mineral wool, glass wool or stone wool. Its energy efficiency reduces energy consumption and its flexibility allows for easy change of raw material composition. Its ease of maintenance and low capital cost are also advantageous.

What is claimed is:

1. A submerged combustion burner (1) comprising
   at least one oxidant feeding tube (5, 9), at least one fuel feeding tube (7), a burner head (11) comprising a peripheral envelope (13), wherein the fuel and oxidant feeding tubes (5, 7, 9) abut against the burner head (11),
   at least two peripheral outward directed nozzles (21), wherein each of the nozzles comprise a nozzle outlet (23), wherein the nozzle outlets (23) are arranged on a peripheral line (25) on the peripheral envelope (13) of the burner head (11),
   a nozzle outlet axis (22) inclined at an angle of 5-30° to the horizontal plane, wherein the nozzles (21) of the burner head (11) are connected to the oxidant feeding tube (5, 9) and to the fuel feeding tube (7), wherein at least a portion of the burner (1) is enveloped by a cooling jacket (31) that extends over part of the length of the feeding tubes (5, 7, 9) up to the burner head (11), wherein the cooling jacket (31) comprises a first connecting tube (32), the burner head (11) comprises a burner cap (33) comprising a burner head space (35) between burner cap (33) and burner head (11), the burner head (11) further comprises through holes (37) connecting the jacket (31) with the burner head space (35), and a cooling fluid feeding tube (39) extending concentrically into the internal gas feeding tube (5) and connecting the burner head space (35) with a second connecting tube (41).

2. The burner of claim 1, further comprising a circular burner head (11).

3. The burner of claim 1, wherein the feeding tubes (5, 7, 9) are concentric.

4. The burner of claim 1, wherein the burner comprises two feeding tubes.

5. The burner of claim 1, wherein the burner comprises three concentric feeding tubes (5, 7, 9), wherein the internal feeding tube (5) is an oxidant feeding tube, the middle feeding tube (7) is a fuel feeding tube and the external feeding tube (9) is an oxidant feeding tube.

6. The burner of claim 1, wherein the burner head comprises at least two extending radially through the burner head (11) starting from the nozzle outlet (23), wherein each is connected by feeding bores (27, 28, 29) to the respective feeding tubes (5,7,9) extending up to and abutting against the burner head (11).

7. A submerged combustion melter comprising a melting chamber (103) equipped with at least one submerged combustion burner of claim 1 capable of comprising a melt.

8. The submerged combustion melter of claim 7, comprising at least two and less than 30 submerged burners (1).

9. The submerged combustion melter of claim 7, wherein the melter is a glass melter in which the burner(s) (1) are arranged at the bottom of the melter.

10. The submerged combustion melter of claim 7, wherein the melter is a glass melter for the manufacture of fibers selected from the group consisting of glass fibers, mineral wool fibers, glass wool fibers and stone wool fibers.

11. The submerged combustion melter of claim 7, wherein the melting chamber is cylindrical, comprises a melting chamber inner diameter of 1.5-3 m, and comprises a melt height in a range of about 0.75-2.2 m.

* * * * *